United States Patent [19]
Needham et al.

[11] 3,845,876
[45] Nov. 5, 1974

[54] PRESSURE TANK SAFETY VENT SYSTEM
[75] Inventors: Robert F. Needham; Dwaine G. Souchek, both of Saint Charles, Mo.
[73] Assignee: ACF Industries, Incorporated, New York, N.Y.
[22] Filed: Oct. 1, 1973
[21] Appl. No.: 402,523

[52] U.S. Cl. .................. 220/203, 137/71, 137/494, 137/514, 137/514.5, 220/89 A
[51] Int. Cl. ............................................ B65d 51/16
[58] Field of Search ........ 220/44 R, 44 D, 89 A, 27; 137/494, 514.3, 514.5, 514.7, 68, 70, 71, 117, 505.11, 514

[56] References Cited
UNITED STATES PATENTS

| | | | |
|---|---|---|---|
| 1,056,842 | 3/1913 | Sharp | 220/44 D |
| 1,091,238 | 3/1914 | Perkins | 137/514.3 |
| 2,860,656 | 11/1958 | Eshbaugh | 220/44 R X |
| 2,933,096 | 4/1960 | Schneider et al. | 137/70 |
| 3,310,197 | 3/1967 | Folmsbee et al. | 220/89 A |
| 3,431,731 | 3/1969 | Ferris | 137/71 X |
| 3,435,984 | 4/1969 | Damiani | 220/89 A |
| 3,472,420 | 10/1969 | Hiatt | 220/89 A |
| 3,598,277 | 8/1971 | Adelman | 220/44 R |
| 3,742,968 | 7/1973 | Kennedy | 137/68 |

Primary Examiner—John Petrakes
Attorney, Agent, or Firm—Henry W. Cummings

[57] ABSTRACT

In accordance with the present invention a pressure tank safety vent system is provided comprising a vent member mounted in a fixed housing. The vent member is hollow and is in fluid communication with the tank. It has at least one port adapted to vent the tank pressure. A resilient assembly is provided which restrains movement of the vent member within the fixed housing. The resilient assembly includes at least two chambers, at least one of which contains a vent controlling fluid. The chambers are in fluid communication by means of at least one vent controlling channel. In the event that pressure build-up within the tank lasts sufficiently long to transport at least a portion of the fluid from one chamber to the other chamber, the vent member will move sufficiently within the fixed housing to vent the tank pressure. In the event that an insufficient amount of fluid is transferred, such as during a surge in the tank, for example, caused by coupling impacts on a railway tank car, the vent member will not vent the system and in a preferred embodiment will return to generally its original position due to the spring constant of the resilient means and/or gravity and the fluid will return to the original chamber. The flow of fluid from one chamber to the other determines the time lapse between pressure build-up and venting. The time may be controlled by the viscosity of the fluid and the cross sectional area of the vent controlling channel. The spring constant of the resilient means, viscosity of the fluid, the size of the channel and the volume and pressure within the chambers may be varied to meet different pressure and/or surge conditions encountered in different applications. A piston and cylinder arrangement may be used to define the vent controlling channel. Displacement of the vent member can be controlled by providing a tapered piston, or providing ports between said first and second chambers which are closed off by a portion of the moving vent member. In one embodiment the vent member may vent the pressure build-up into a vent chamber and a burst disk is provided between the vent chamber and the atmosphere. In venting to atmosphere appropriate means, such as a cap, may be provided to direct the vented material away from personnel which may be in the area of the pressure tank.

43 Claims, 13 Drawing Figures

PATENTED NOV 5 1974

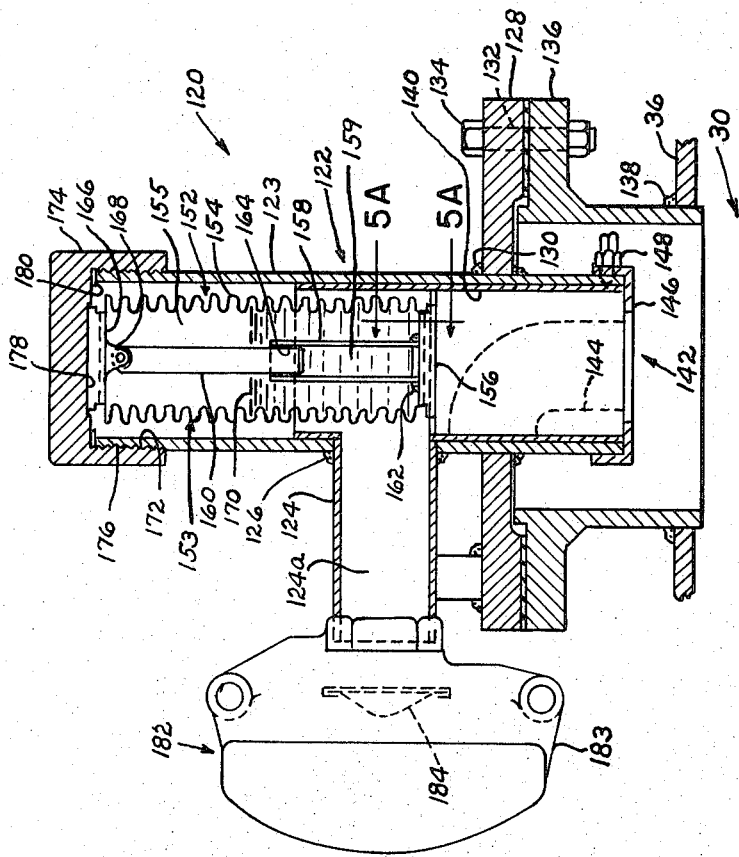
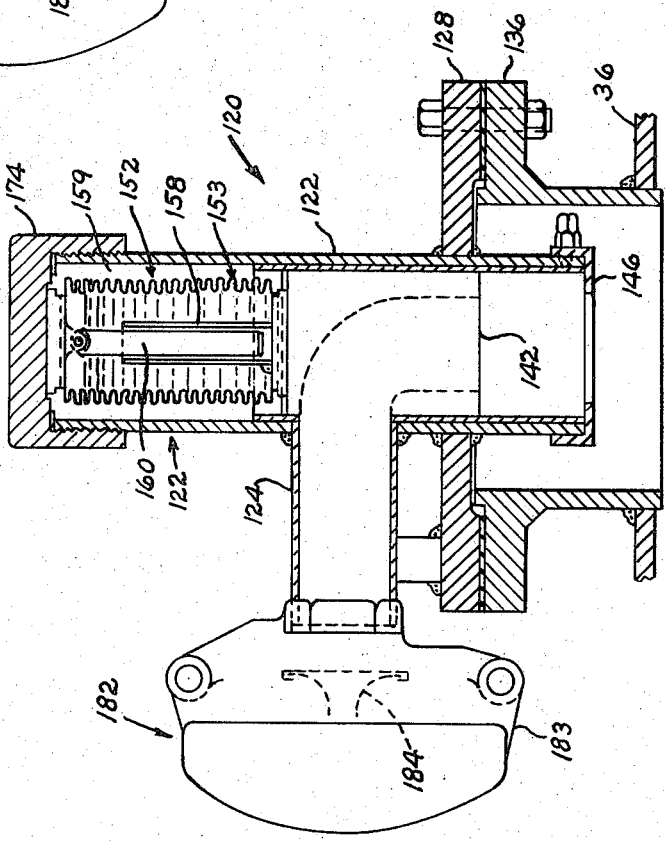

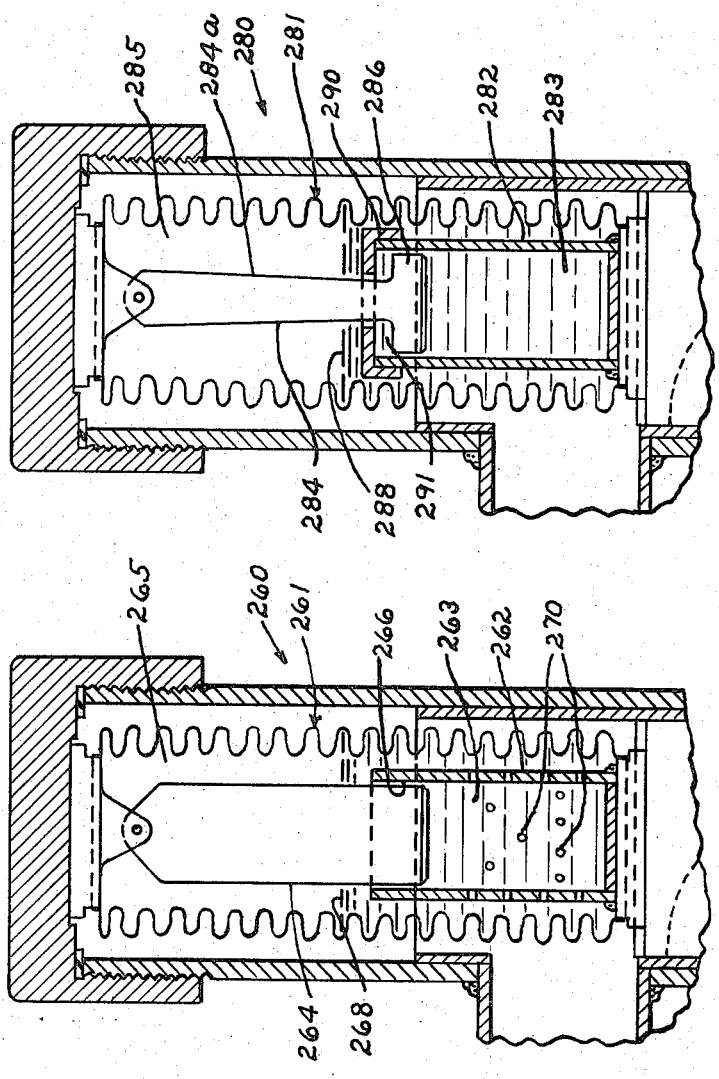

PRESSURE TANK SAFETY VENT SYSTEM

BACKGROUND OF THE INVENTION

This invention relates to tanks which are transported either on railroad cars, in overland trucks, and in some applications to tanks transported in ships. In all of these modes of travel, a danger exists that the pressure may build up in the tank, for example, because of increased temperature encountered during transit, and because of the added pressure, the tank bursts. Not only is there resulting property damage to the tank and to surrounding apparatus, but also there is great danger to workmen and persons who may be nearby at the time of the explosion. The danger is particularly acute when the tanks contain corrosive or dangerous liquids, such as sodium hydroxide, sulfuric and hydrochloric acids and certain hydrocarbon chemicals, because of the high risk of personal injury to individuals if the chemicals escape.

One solution to this problem has been to provide the tanks with burst disks with or without cutter bars. In the event that the pressure within the tank builds up to a certain design pressure, the disk will burst and relieve the pressure in the tank. This avoids an explosion of the magnitude encountered if the whole tank explodes. However, this burst disk arrangement has the disadvantage that any workmen or other persons around the tanks at the time of the disk's rupture can be seriously injured by splash from these chemicals.

One problem which has been encountered with respect to the burst disk safety arrangement, particularly when mounted in railroad tank cars which are subjected to impact during coupling of cars, is that pressure surges are developed within the tanks resulting from the coupling impacts. In the case of railroad cars, the pressure surges are of short duration and are generally completed within from about 0.05 to 0.08 seconds. However, these pressure surges often cause the disks to burst when the static or non-surge pressure in the tank is not sufficient to warrant the disk bursting. Thus the problem presented is one of how to prevent the disk from bursting under short term impact pressures within the tank, and at the same time insure that the disk will burst when the static or non-surge pressure in the tank has increased to a dangerous level. Similar impact pressure build-ups occur in some applications in overland tank car trucks and in tanks carried on ships. Thus similar problems exist regarding the bursting of discs in these applications.

Non-surge or gradual pressure build-up can have various causes. For example, in one instance, the build-up could be caused by an external heat rise, causing air, vapor and liquid to expand and actuate safety vent system. In another instance the non-surge pressure within tank could be induced by an operator applying compressed air or other gas to tank to assist in unloading same. This induced air pressure if left unattended could build up inside the tank if the lading was not being removed in direct relation to the pressure input.

SUMMARY OF THE INVENTION

In accordance with the present invention a pressure tank safety vent system is provided comprising a vent member mounted in a fixed housing. The vent member is hollow and is in fluid communication with the tank. It has at least one port adapted to vent the tank pressure. A resilient assembly is provided which restrains movement of the vent member within the fixed housing. The resilient assembly includes at least two chambers, at least one of which contains a vent controlling fluid. The chambers are in fluid communication by means of at least one vent controlling channel. In the event that pressure build-up within the tank lasts sufficiently long to transport at least a portion of the fluid from one chamber to the other chamber, the vent member will move sufficiently within the fixed housing to vent the tank pressure. In the event that an insufficient amount of fluid is transferred, such as during a surge in the tank, for example, caused by coupling impacts on a railway tank car, the vent member will not vent the system and in a preferred embodiment will return to generally its original position due to the spring constant of the resilient means and/or gravity and the fluid will return to the original chamber. The flow of fluid from one chamber to the other determines the time lapse between pressure build-up and venting. The time may be controlled by the viscosity of the fluid and the cross sectional area of the vent controlling channel. The spring constant of the resilient means, viscosity of the fluid, the size of the channel and the volume and pressure within the chambers may be varied to meet different pressure and/or surge conditions encountered in different applications. A piston and cylinder arrangement may be used to define the vent controlling channel. Displacement of the vent member can be controlled by providing a tapered piston, or providing ports between said first and second chambers which are closed off by a portion of the moving vent member. In one embodiment the vent member may vent the pressure build-up into a vent chamber and a burst disk is provided between the vent chamber and the atmosphere. In venting to atmosphere appropriate means, such as a cap, may be provided to direct the vented material away from personnel which may be in the area of the pressure tank.

OBJECT

It therefore is an object of the present invention to provide a safety vent arrangement which will not burst or vent during short term impact pressures but will vent at approximately designed pressure when the non-surge pressure build-up within the tank reaches approximately design level.

Other objects will be apparent from the following description and drawings.

THE DRAWINGS

FIG. 5 is a sectional view illustrating an embodiment of a safety vent system in a static position;

FIG. 5A is a sectional view along the line 5A—5A in FIG. 5;

FIG. 6 is a sectional view of the safety vent system shown in FIG. 5 in an activated position;

FIGS. 7, 8, 9, 10 and 11 are sectional views of different metering means which can be applied to the safety vent systems shown in FIGS. 2 and 5;

DETAILED DESCRIPTION

The present invention will be described in connection with a railroad tank car. However, it is to be understood that the safety vent system of the present invention is not limited to use in railroad tank cars, but rather may be used in overland tank trucks, in tanks transported by boats or ships, or in any other transportation or storage application where pressure surges are a problem in tanks carrying liquid lading.

Figure 1:
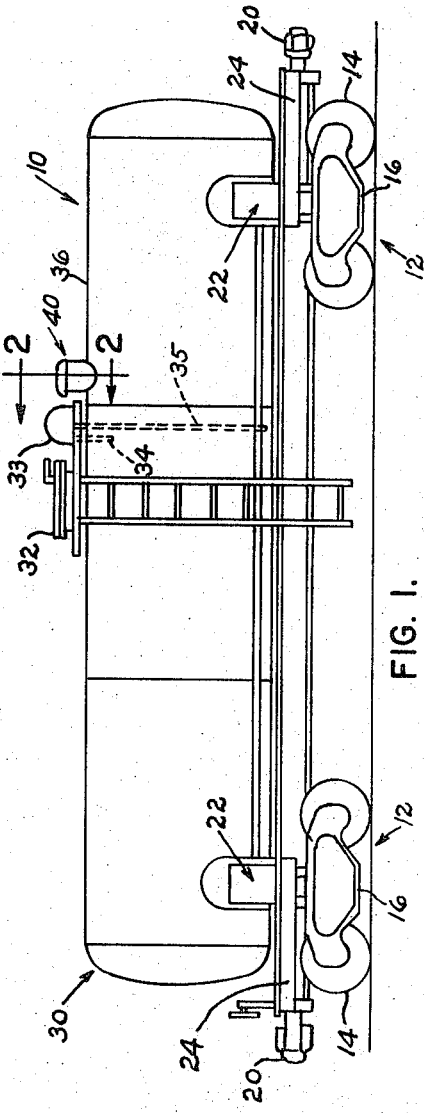
FIG. 1 is a side elevational view of a railroad tank car.

FIG. 1 shows a railroad car 10 having conventional trucks 12 including wheels 14, conventional side frames 16, and conventional truck bolsters (not shown). A conventional coupler structure 20 is also provided. The tank 30 is supported upon the car by means of tank bolster structure 22 mounted upon sill 24 and supported by the truck bolster.

A hatch opening 32 is provided for entering or loading the car. An unloading arrangement 33 is also provided, housing valves (not shown) suitable to pressurize the car by means of short conduit 34 and discharge the lading through long conduit 35 in the usual manner. One or more discharge outlets could also be provided for discharging the tanks at the bottom thereof by gravity, if desired. All of the structure described so far is known in the art.

In accordance with the present invention, tank 30 is provided with a safety vent system indicated generally at 40. Mounted on the upper portion 36 of the tank through an opening therein 38 (FIG. 2) shown in communication with the tank interior, attached, for example, by welding 39 is a housing 42, preferably hollow or otherwise providing a continuous opening therethrough. Housing 42 is preferably cylindrical, and is preferably made in two parts including a lower housing 43 and an upper housing 50. Lower housing 43 may have a flange or ring portion 44 attached to it such as by welding 45, and having bolt openings 46 therein. The top portion of flange 44 is preferably machined at 47 to provide a seat for a sealing means, such as a gasket 68.

Upper housing 50 also preferably cylindrical may have a body portion 52 and an outwardly extending flange portion 54 having bolt openings 55 therein.

Body portion 50 may be bored at 56 to allow for a bearing or bushing 58 to be inserted. Upper housing 50 is preferably machined in the lower portion thereof to form a seat 60. The seat 60 is further defined by a protrusion 62 which serves as a guide, to be described hereinafter. Upper housing 50 is also preferably machined at 64 to provide a seat for lower housing 43.

The outer flange 54 of upper housing 50 is also preferably machined at 66 to provide a seat for gasket 68. Gasket 68 may be applied when the safety vent system 40 is assembled, for example, by applying bolts 70 and nuts 72.

The safety vent system 40 is further comprised of a vent member indicated generally at 90. Member 90 likewise preferably cylindrical can be, for example, a casting or a weldment. It has a base portion 92 and a vent portion 94. The base portion 92 has a flange 96 and a seat 98. Vent portion 94 is provided with openings or ports 102, preferably a plurality, arranged circumferentially therearound. The vent portion 94 may be threaded at 100 to allow it to be fastened to an optional cover portion 74 during assembly.

Cover portion 74 may have a top section 76 and overhang portion 78. Cover 74 preferably has a portion 80 which is threaded at 82 to receive the upper portion of vent portion 94.

A sealing means is provided between upper housing 50 and vent member 90 indicated generally at 101, for example, comprising an O-ring 101a.

The safety vent system further comprises a resilient assembly 104 comprising a resilient means 106 having a chamber 106a and a reservoir chamber 108. Resilient means 106 is preferably cylindrical, and may comprise a metallic bellows or an elastomeric housing or other resilient housing adapted to contain a vent controlling fluid, preferably a liquid of appropriate viscosity. Resilient means 106 is in communication with a hollow reservoir 108. For example, resilient means 106 may be bonded to plate 110 which in turn is fastened to the cylindrical reservoir 108, for example, by welding or mechanical fasteners. Cylindrical reservoir 108 and resilient means 106 are then provided with at least one vent controlling channel or opening 112, preferably a plurality, for example, arranged circumferentially around vent member 90.

Figure 2:
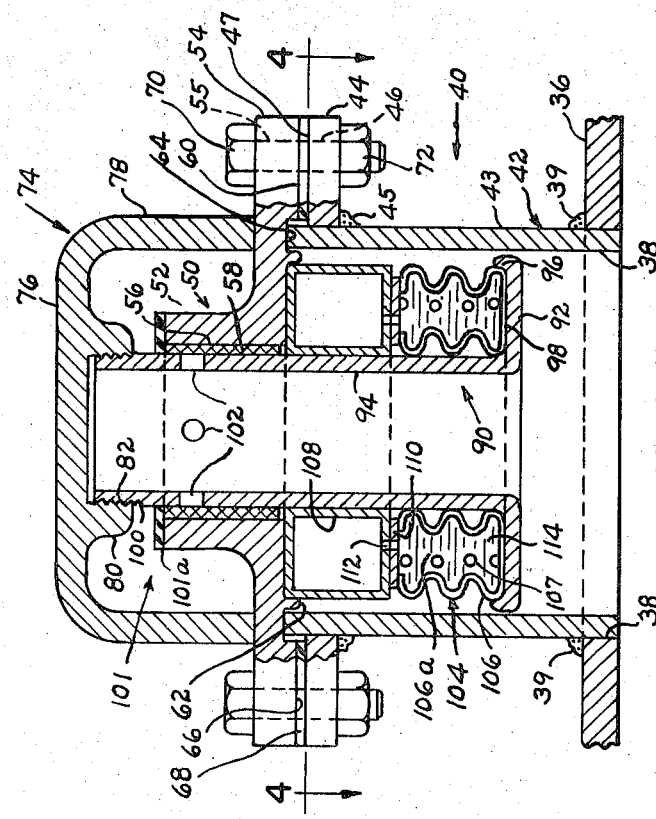
FIG. 2 is a sectional view along the line 2—2 in FIG. 1 illustrating a safety vent system in a static position in accordance with the present invention.

The resilient means 106 is charged with an appropriate fluid 114, such as silicone oil, and assembled complete as shown in FIG. 2. The seat 60 and protrusion 62 form a guide for positioning or retaining resilient assembly 104.

If desired, resilient means 106 can further be provided with an inner spring 107. Spring 107 will assist in returning vent member 90 to static position after it has been activated. Return of the vent member will also allow the fluid which has been forced into cylindrical reservoir 108 through metering openings or channels 112, to return to chamber 106a.

In the event of a surge in pressure tank 30, the surge acts upon resilient assembly 104, and forces the fluid through openings 112. If the pressure applied to base portion 92 lasts long enough for substantially all fluid to pass through openings 112, ports 102 will vent the pressure. Thus the surges commonly encountered due to impacts, for example, in the coupling of railway cars, are of such short duration, usually 0.05 to 0.08 seconds that an insufficient amount of fluid will pass through openings 112 to vent the system. As the surge subsides the resilient means 106 due to its own spring bias will again assume the position shown in FIG. 2. If desired, an inner spring 107 may be provided to assist in returning the piston to its generally original position.

Figure 4:
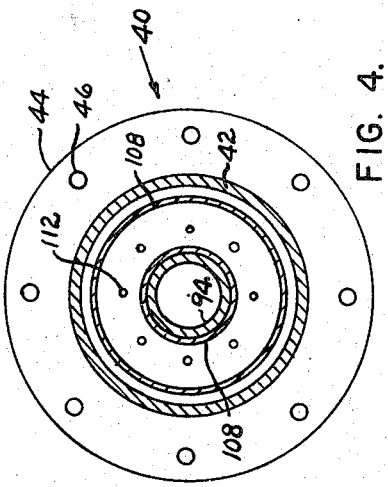
FIG. 4 is a sectional view along line 4—4 in FIG. 2.
Figure 3:
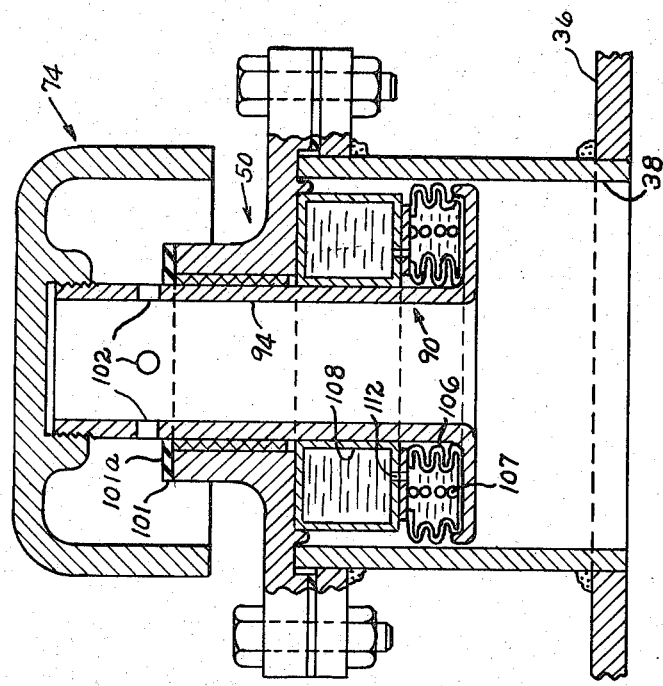
FIG. 3 is a sectional view illustrating the safety vent system in an activated position in accordance with the present invention.

When a non-surge pressure has built up in tank 30, for example, caused by a heat rise or induced air, fluid will continue to flow through channels 112 and member 90 will move upwardly to the position shown in FIG. 3 and the safety vent system will vent through ports 102 to the atmosphere, or to a vent chamber. When the pressure has dissipated the resilient means and piston move back to the position shown in FIG. 2. Cap 74 and overhang 78 will direct vented material downwardly and away from personnel in the surrounding area.

The viscosity of fluid 114, the size of openings 112, the volume of chambers 106a and 108 and the spring rate of resilient means 106 and/or spring 107 may be varied by those skilled in the art to avoid surges of desired duration venting the system, while allowing other pressure build-ups or even surges of longer duration to vent the system.

By way of non-limiting example only, in a railway tank car in order to avoid surges resulting from impact on tank cars resulting from car coupling, the surges generally last about 0.05 to 0.08 seconds. To avoid surges of this order of magnitude venting the system, fluid 114 is a liquid, preferably having a viscosity of 500 to 2,000 centistokes, most preferably 750 – 1,500 centistokes. The volume of chambers 106 and 108 is preferably such that a volume of at least about 10 cubic inches of fluid be transferred. Chamber 108 should have a volume in excess of the displaced fluid in order to prevent excessive pressure build-up within chamber 108 due to compression of the entrapped air. Chamber 106, for example, may have a volume of about 10 to about 100 cubic inches.

The total cross-sectional area of opening(s) 112 is preferably 0.01 to about 1 square inch, most preferably 0.02 to 0.1 square inch. The force acting upward due to tank pressures is equal to tank pressure "$P_t$" × $A_d$, effective area below the resilient assembly.

The forces acting downward equal the spring rate of the resilient means "S" × distance of vent member travel "D" plus dead weight including resilient assembly and fluid. "W" plus back pressure of compressed air pocket in the second chamber "$P_2$" × effective area "$A_2$" of the pocket acting downwardly.

For static equilibrium, forces acting upwardly must equal forces acting downwardly, i.e., $$F = P_t A_d = S \times D + W + P_2 A_2$$

(1)

Under static conditions, or gradual changes in "$P_t$", the damping effect of the resilient assembly is zero or negligible and equation No. 1 can be used to determine the relationship between pressure and travel.

For a given design, travel "D" can be controlled by varying $P_2$.

$P_2$ can be controlled by adjusting volume $V_1$, $V_2$, and $P_1$ in the relationship $$P_1 V_1 = P_2 V_2$$

(2)

where $P_1$ and $V_1$ are the volume and pressure in the second chamber with the resilient means in the original non-pressure build up position and $P_2$ and $V_2$ are the pressure and volume in the second chamber after movement of vent member a distance D during a pressure build-up.

For example, if pressure within the tank car in some railway tank cars reaches 75 psig, it is desired that the tank be vented. Housing 42 is usually cylindrical often with about a 6 inch inside diameter, and base portion 92 often has about a 5⅞ inch diameter. Therefore the effective area "$A_d$", the area which is effective in creating an upward force from tank pressure "$P_t$" in equation (1) above is about 20 in.² Thus upward force F in equation (1) would be 20 in.² × 75 psig or about 1,500 pounds.

This force should be more than the force acting downwardly or else vent member 90 would not move upwardly to vent. The pressure within chamber 108 acts downwardly through the resilient means 106. Thus pressure within chamber 108 should not exceed about 1,500 pounds divided by the effective area of resilient means 106 (about 15 in.²), or 100 psig. If the displaced fluid in chamber 108 equaled 10 in.³ then the air volume above fluid should be about 11.4 in.³

The foregoing is intended merely as an illustrative calculation of how the various variables in the safety vent system can be determined and/or controlled. The specific numerical values used are not to be interpreted as limiting of the present invention. The calculation and equations are merely intended to explain the present invention more completely to those skilled in the art. Wide adjustment of these parameters to meet varying pressure and/or surge conditions is within the scope of the present invention.

In the embodimnt shown in FIG. 5, a safety vent system comprising a piston mounted in a housing 122 restrained by a resilient assembly and having a burst disk shown generally at 120. Housing 122 is comprised of a preferably cylindrical member 123 mounted in a vertical position. A container 124 preferably cylindrical is preferably mounted in a horizontal position to define a vent chamber 124a. Members 123 and 124 are joined at 126 by mechanical fasteners or by welding. Member 123 has at its lower portion a cylindrical collar 128 welded or affixed with mechanical fasteners to it at 130. Collar 128 is then appropriately mounted on tank 30. For example, collar 128 may be drilled at 132 to allow it to be bolted at 134 to cylindrical flange 136 which is mounted to tank shell 36, such as by welding 138.

Vertical member 123 is fitted with a sleeve 140 made of an appropriate metallic or plastic material (such as polytetrafluoroethylene (TFE), polypropylene or polystyrene). A movable slug or valve 142 made from appropriate metallic or plastic material is drilled or bored at 144. The lower portion or end of member 123 is fitted with a bored ring or collar 146 which holds slug 142 in place. Collar 146 is held in place by appropriate means, for example, set screw 148 to member 122.

As shown in FIG. 5A, the slug 142 has a protrusion 150 formed on its top surface. The purpose of protrusion 150 is to prevent rotation of slug 142 when installed with the resilient assembly indicated generally at 152.

Resilient assembly 152 comprises a resilient means 153 preferably metallic or elastomeric bellows 154 which is fastened at its base to cylindrical portion 156 by appropriate means, such as welding, or mechanical fasteners, thus defining an outer chamber or reservoir 155. Base portion 156 has a groove 151 in it which engages the guide 150 of slug 142 to prevent rotation. Base portion 156 has a hollow container 158 preferably cylindrical welded to it at 162. Container 158 defines an inner chamber 159 and receives piston 160. A clearance or diameter difference between container 158 and piston 160 at 164 will allow for metering of fluid in the resilient assembly 152 in the event of pressure build-up in tank 30. The same considerations regarding metering channel area, fluid viscosity and the volume of chambers 155 and 159 described hereinbefore are equally applicable to this embodiment.

A closure to the resilient assembly is shown at 166. Closure 166 is preferably provided with a clevis 168 which allows piston 160 to be fastened to it.

Horizontal cylinder 124 is threaded at its outer end to receive burst disk arrangement indicated generally at 182. A burst disk 184 of known construction is provided in an appropriate housing 183. See, for example, Chemical Engineering July 5, 1965, pages 127–130.

Resilient means 153 is charged with a fluid, preferably a liquid, such as a silicone oil, to a predetermined depth at 170. Bellows 154 is fastened to closure 166. Vertical cylinder 122 is threaded at 172 to fit cap 174 which is threaded at 176. Cap 174 is counterbored at 178 to receive and position closure 166. A seal 180 is placed between cylinder 122 and cap 174.

As shown in FIG. 5, the safety vent system 120 is in static position. Upon the event of a pressure build-up in tank 30 slug 142 will start to rise and compress resilient means 153. Fluid in chamber 159 will be forced or metered around piston 160 and into chamber 155. If the pressure build-up is of short duration, such as a surge, slug 142 will not rise sufficiently to allow pressure to enter vent chamber 124a. The spring constant of resilient means 153 and/or gravity will cause slug 142 to return to generally its original position as the pressure is reduced.

If the pressure is maintained long enough, slug 142 will rise sufficiently as more fluid is transferred into chamber 159, that opening 144 will allow pressure to enter vent chamber 124a. At a predetermined design pressure in chamber 124a, burst disk 184 will rupture, causing pressure in vent chamber 124a to be vented to the atmosphere. This is shown in FIG. 6. The burst pressure of disk 184 may vary as desired. For many railroad applications burst pressures of 25 psi to 100 psi and sometimes higher have been used. After venting and loss of internal pressure, the system 120 will return generally to the position shown in FIG. 5.

The size of opening 164, the viscosity of the fluid, the volume of chambers 155 and 159, and the burst pressure of disk 184 may be varied to counteract surges of desired duration, while allowing venting after pressure build-up to a desired level after a desired time period.

Embodiments comprising different methods of metering the fluid in the elastomeric or bellows resilient means are shown in the FIGS. 7 through 11. In these embodiments the vent member may either vent the tank pressure directly to the atmosphere along the lines described in connection with FIGS. 1–4 or the vent member may vent the tank pressure into a vent chamber along the lines described in connection with FIGS. 5 and 6.

Figure 7A:
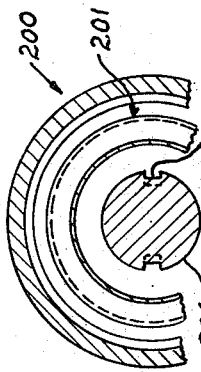
FIG. 7A is a view along the line 7A—7A in FIG. 7.
Figure 7:
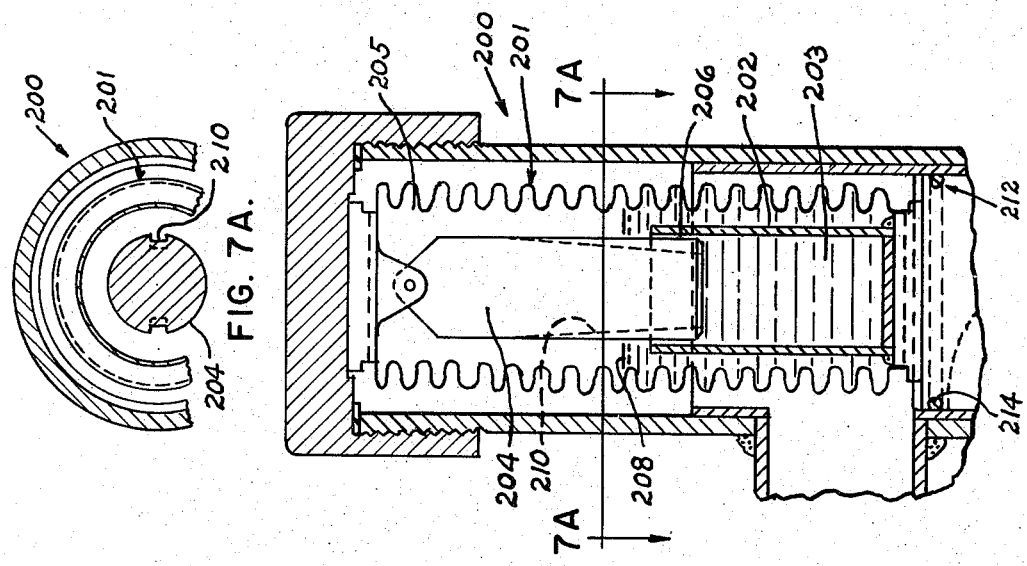

In the embodiment shown in FIG. 7 the housing 200 and resilient assembly 201 are generally the same as described in FIG. 5, with the exception of the contour of the piston metering flow of fluid between chambers 203 and 205. Cylinder 202 and piston 204 have diameter differences 206 for allowing metering of fluid 208. Tapered grooves 210 also are provided to allow for fluid metering. Since the grooves are tapered it takes more pressure per unit length of cylinder travel as the cylinder moves upwardly along piston 204.

Figure 8:
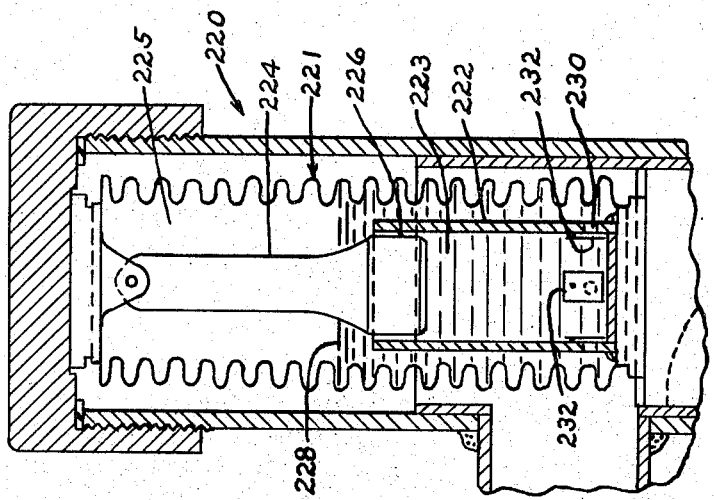

In the embodiment shown in FIG. 8 the housing and resilient assembly are generally indicated respectively 220 and 221. Cylinder 222 and piston 224 have diameter differences 226 for allowing metering of fluid 228 between chambers 223 and 225. Ports 230 have been drilled in cylinder 222 at the bottom thereof and are covered with flaps 232 which will act as check valves at time of rapid pressure build-up, i.e., surge, but will allow fluid to reenter cylinder 222 after surge. This will allow the piston to retrace the cycle in a much shorter time span than the embodiments shown in FIGS. 5 and 7.

Figure 9:
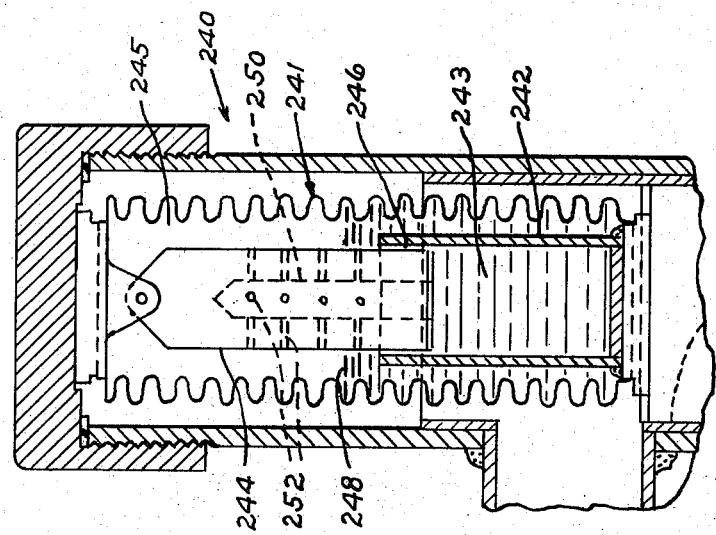

In the embodiment shown in FIG. 9 the housing and resilient assembly are generally indicated at 240 and 241. Cylinder 242 and piston 244 have diameter differences 246 for allowing metering of fluid 248 between chambers 243 and 245. Piston 244 is bored at 250 and metering ports 252 are bored circumferentially. As the ports 252 are closed off by cylinder 242 as the latter moves upwardly, this will result in reducing chamber travel relative to time, since more work energy will have to be absorbed per unit length of cylinder travel.

In the embodiment shown in FIG. 10 the housing and resilient assembly are generally indicated at 260 and 261. Cylinder 262 and piston 264 have diameter differences 266 for allowing metering of fluid 268 between chambers 263 and 265. Cylinder 262 has a plurality of ports 270 drilled circumferentially. As ports are closed off by piston movement, the piston travel is reduced relative to time and will absorb more work energy per unit length. It will be apparent from FIGS. 9 and 10 that a wide variety of desired work energy absorption profiles may be obtained by appropriate size and location of ports, and the action of the movable cylinder closing off selected ports.

In the embodiment shown in FIG. 11 the housing and resilient assembly are generally indicated at 280 and 281. Cylinder 282 and piston 284 again haVe diameter differences 286 for allowing metering of fluid 288 between chambers 283 and 285. Cylinder 282 has a cap 290 attached which defines an addition chamber 291 which allows for further metering due to the varying diameter of piston 284. Thus this embodiment is a dual device that is capable of absorbing work energy at a constant rate in the lower chamber and at an increasing rate in the upper chamber due to the tapered portion 284a of piston 284. Furthermore, this concept may be more economical in reducing machining costs since it is not necessary in this embodiment to drill a plurality of ports in a container or cylinder.

In the event that the embodiments shown in FIGS. 7–11 are utilized to vent the tank pressure directly to atmosphere a sealing means is preferably provided between the vent member and the housing or housing liner illustrated in FIG. 7 generally at 212, for example, comprising an O-ring 214. If the tank pressure is vented directly to atmosphere, it is preferred to provide means for directing the vented material away from personnel who may be in the tank area, for example, a cover similar to cover 74 in FIGS. 2 and 3 may be used, having an overhang portion 78 which directs vented materials downwardly toward the tank surface.

What is claimed is:

1. A pressure tank safety vent system comprising:
    a hollow housing adapted to be in communication with an opening in said pressure tank;
    a vent member mounted within the hollow portion of said housing; said vent member having a vent opening therein in communication with the opening in said housing, and having at least one port in communication with said vent opening;
    said vent member being movable within said hollow portion between first and second positions, in said first position said housing preventing said port from venting said pressure tank and a second position wherein said port is adapted to vent said pressure tank;

said housing further having mounted therein a resilient assembly comprising:

resilient means biased into an extended position; first and second chambers at least one of which contains a vent controlling fluid, said chambers being in fluid communication by means of at least one vent controlling channel;

said resilient assembly being in mechanical engagement with at least a portion of said housing;

whereby during a pressure build-up in said pressure tank, the tank pressure is applied to said resilient assembly and said vent controlling fluid will pass through said vent controlling channel, and in the event the pressure build-up continues for a time sufficient to transfer a substantial portion of said fluid from said first channel to said second channel, said vent member will move into said second position and vent said pressure tank.

2. A pressure tank safety vent system according to claim 1 wherein in the event that said pressure build-up is of a sufficiently short duration as to transfer an insufficient amount of fluid from said first chamber to said second chamber to move said vent member to said second position, said vent member will return to approximately its original position.

3. A pressure tank safety vent system according to claim 2 wherein said resilient means comprises a bellows.

4. A pressure tank safety vent system according to claim 2 wherein said fluid is a liquid having a viscosity of 500 to 2,000 centistokes.

5. A pressure tank safety vent system according to claim 4 wherein the total area of said channels is from about 0.01 to about 1 square inch.

6. A pressure tank safety vent system according to claim 5 wherein the total area of said opening is from about 0.02 to about 0.1 square inch.

7. A pressure tank safety vent system according to claim 6 wherein said liquid has a viscosity of from about 750 to about 1,500 centistokes.

8. A pressure tank safety vent system according to claim 7 wherein said liquid is silicone oil.

9. A pressure tank safety vent system according to claim 2 wherein said resilient means comprises an elastomeric housing.

10. A pressure tank safety vent system according to claim 2 wherein a bushing is provided in said housing and wherein said piston is movable along said bushing.

11. A pressure tank safety vent system according to claim 2 wherein said channel is defined by clearance between a piston and a portion of said first chamber.

12. A pressure tank safety vent system according to claim 11 wherein said first chamber and said piston are movable with respect to the other.

13. A pressure tank safety vent system according to claim 11 wherein said first and second chambers are located within said resilient means.

14. A pressure tank safety vent system according to claim 11 wherein said piston is fixed and said first chamber is movable with respect thereto.

15. A pressure tank safety vent system according to claim 11 wherein said piston is tapered.

16. A pressure tank safety vent system according to claim 11 wherein check valve ports are provided between said first chamber and said second chamber.

17. A pressure tank safety vent system according to claim 11 wherein a plurality of ports are provided between said first and second chambers and wherein selected ports are closed off as said vent member moves toward said second position.

18. A pressure tank safety vent system according to claim 17 wherein said piston is hollow and is provided with a plurality of ports and wherein as said first chamber rises it closes off selected ones of said ports.

19. A pressure tank safety vent system according to claim 17 wherein a greater force is required to move said vent member a given additional distance as additional ports are closed off.

20. A pressure tank safety vent system according to claim 11 wherein a third chamber is defined between said first and second chambers.

21. A pressure tank safety vent system according to claim 20 wherein said third chamber is defined by a cap mounted upon said first chamber.

22. A pressure tank safety vent system according to claim 21 wherein said piston is tapered in the vicinity of said third chamber and wherein a constant force is required to move said first chamber with respect to said piston but a greater force is required to move said third chamber with respect to said piston.

23. A pressure tank safety vent system according to claim 1 wherein a plurality of vent controlling channels are provided between said first and second channels.

24. A pressure tank safety vent system comprising: a hollow housing adapted to be in communication with an opening in said pressure tank;

a vent member mounted within the hollow portion of said housing; said vent member having a vent opening therein in communication with the opening in said housing, and having at least one port in communication with said vent opening;

said vent member being movable within said hollow portion between first and second positions, in said first position said housing preventing said port from venting said pressure tank and a second position wherein said port is adapted to vent said pressure tank to the atmosphere;

said housing further having mounted therein a resilient assembly comprising:

resilient means biased into an extended position; first and second chambers at least one of which contains a vent controlling fluid, said chambers being in fluid communication by means of at least one vent controlling channel;

said resilient assembly being in mechanical engagement with at least a portion of said housing;

whereby during a pressure build-up in said pressure tank, the tank pressure is applied to said resilient assembly and said vent controlling fluid will pass through said vent controlling channel, and in the event the pressure build-up continues for a time sufficient to transfer a substantial portion of said fluid from said first channel to said second channel, said vent member will move into said second position and vent said pressure tank to the atmosphere.

25. A pressure tank safety vent system according to claim 24 wherein in the event that said pressure build-up is of a sufficiently short duration as to transfer an insufficient amount of fluid from said first chamber to said second chamber to move said vent member to said second position, said vent member will return to approximately its original position.

26. A pressure tank safety vent system according to claim 25 wherein said resilient means is provided with a spring to assist the resilient means to return the original position.

27. A pressure safety vent system according to claim 25 wherein said housing is made in at least two parts comprising an upper housing and a lower housing and a sealing means is provided between said housing.

28. A pressure tank safety vent system according to claim 25 wherein said resilient means is mounted upon said vent member and said reservoir is mounted above said resilient means.

29. A pressure tank safety vent system according to claim 25 wherein reservoir is mounted upon said vent member and said resilient means is mounted above said reservoir and wherein said resilient means engages a portion of said housing.

30. A pressure tank safety vent system according to claim 25 wherein a cover is affixed to said vent member to direct the flow of vented material.

31. A pressure tank safety vent system according to claim 25 wherein said vent member is provided with a flange to maintain said resilient assembly.

32. A pressure tank safety vent system according to claim 31 wherein means are also provided on said housing to maintain engagement of said resilient assembly.

33. A pressure tank safety vent system according to claim 32 wherein said means comprise at least one protrusion.

34. A pressure tank safety vent system according to claim 25 wherein sealing means is provided between said vent member and said housing.

35. A pressure tank safety vent system according to claim 34 wherein said sealing means is an O-ring.

36. A pressure tank safety vent system comprising: a hollow housing adapted to be in communication with an opening in said pressure tank;
a vent member mounted within the hollow portion of said housing; said vent member having a vent opening therein in communication with the opening in said housing, and having at least one port in communication with said vent opening;
said vent member being movable within said hollow portion between first and second positions, in said first position said housing preventing said port from venting said pressure tank and a second position wherein said port is adapted to vent said pressure tank into a vent chamber;
said housing further having mounted therein a resilient assembly comprising:
resilient means biased into an extended position;
first and second chambers at least one of which contains a vent controlling fluid, said chambers being in fluid communication by means of at least one vent controlling channel;
said resilient assembly being in mechanical engagement with at least a portion of said housing;
a burst disk mounted in said vent chamber adapted upon bursting to vent said vent chamber to the atmosphere;
whereby during a pressure build-up in said pressure tank, the tank pressure is applied to said resilient assembly and said vent controlling fluid will pass through said vent controlling channel, and in the event the pressure build-up continues for a time sufficient to transfer a substantial portion of said fluid from said first channel to said second channel, said vent member will move into said second position and vent said pressure tank into said vent chamber, and whereby in the event the pressure in said vent chamber exceeds the design pressure of said burst disk, said burst disk will burst and vent said vent chamber to the atmosphere.

37. A pressure tank safety vent system according to claim 36 wherein in the event that said pressure build-up is of a sufficiently short duration as to transfer an insufficient amount of fluid from said first chamber to said second chamber to move said vent member to said second position, said vent member will return to approximately its original position.

38. A pressure tank safety vent system comprising: vent means connected to said tank and operable by a predetermined pressure within said tank to vent said tank; and
resilient time delay means operatively connected with said vent means, said resilient time delay means comprising at least two chambers separated by a passageway, one of said chambers containing a fluid for delaying opening of said vent means to vent said tank until said predetermined pressure has existed for a predetermined period of time to transfer at least a portion of said fluid from one of said chambers to the other through said passageway, whereby said vent means is not operative to vent said tank by pressure surges of a time duration less than said predetermined period of time.

39. A pressure tank safety vent system according to claim 38 wherein in the event of a pressure surge said resilient time delay means absorb at least some energy from said pressure surge.

40. A pressure tank safety vent system according to claim 39 wherein said resilient time delay means comprises a bellows chamber and a reservoir, and fluid passes from said bellows chamber into said reservoir.

41. A pressure tank safety vent system according to claim 39 wherein in said resilient time delay means at least one of said chambers comprises a cylinder having a piston movable with respect thereto adapted to absorb energy from said surges.

42. A pressure tank safety vent system according to claim 38 wherein said vent means comprises at least one rupturable member.

43. A pressure tank safety vent system according to claim 38 wherein said vent means comprises at least one port.

* * * * *

UNITED STATES PATENT OFFICE
CERTIFICATE OF CORRECTION

Patent No. 3,845,876           Dated November 5, 1974

Inventor(s) Robert F. Needham et al.

It is certified that error appears in the above-identified patent and that said Letters Patent are hereby corrected as shown below:

Column 8, line 61, "opening" should read -- hollow portion --.

Column 9, line 18, "channel" both occurrences) should read -- chamber --.

Column 10, line 37, "opening" should read -- hollow portion --.

Column 10, line 61, "channel" (both occurrences) should read -- chamber --.

Column 11, line 45, "opening" should read -- hollow portion --.

Column 12, line 11, "channel" (both occurrences) should read -- chamber --.

Signed and Sealed this

Thirty-first Day of January 1978

[SEAL]

Attest:

RUTH C. MASON
Attesting Officer

LUTRELLE F. PARKER
Acting Commissioner of Patents and Trademarks